United States Patent
Tate

(12) 
(10) Patent No.: US 12,476,521 B2
(45) Date of Patent: Nov. 18, 2025

(54) CERAMIC SLEEVE FOR A STATOR HOUSING OF AN ELECTRICAL MACHINE

(71) Applicant: Hamilton Sundstrand Corporation, Charlotte, NC (US)

(72) Inventor: David James Tate, Hemel Hempstead (GB)

(73) Assignee: Hamilton Sundstrand Corporation, Charlotte, NC (US)

( * ) Notice: Subject to any disclaimer, the term of this patent is extended or adjusted under 35 U.S.C. 154(b) by 233 days.

(21) Appl. No.: 18/198,129

(22) Filed: May 16, 2023

(65) Prior Publication Data

US 2023/0378850 A1 Nov. 23, 2023

(51) Int. Cl.
*H02K 9/197* (2006.01)
*H02K 5/10* (2006.01)

(52) U.S. Cl.
CPC .............. *H02K 9/197* (2013.01); *H02K 5/10* (2013.01)

(58) Field of Classification Search
CPC .. H02K 2201/03; H02K 2213/03; H02K 5/10; H02K 5/128
See application file for complete search history.

(56) References Cited

U.S. PATENT DOCUMENTS

| | | | | |
|---|---|---|---|---|
| 2,896,882 | A * | 7/1959 | Nelson | B64C 23/005 180/2.2 |
| 4,227,108 | A | 10/1980 | Washizu et al. | |
| 6,489,697 | B1 * | 12/2002 | Ozawa | H02K 3/30 310/58 |
| 6,809,442 | B2 | 10/2004 | Kaneko et al. | |
| 8,946,962 | B2 | 2/2015 | Phillips et al. | |
| 2008/0218015 | A1 * | 9/2008 | Weeber | C22C 19/055 310/90.5 |
| 2012/0112571 | A1 | 5/2012 | Stephens | |
| 2021/0083555 | A1 * | 3/2021 | Lahr | H02K 9/19 |
| 2022/0231556 | A1 * | 7/2022 | Gulley | H02K 1/278 |

FOREIGN PATENT DOCUMENTS

| | | |
|---|---|---|
| DE | 112015006328 T5 | 12/2017 |
| DE | 102019210526 B3 | 10/2020 |
| DE | 102020117266 A1 | 1/2022 |
| EP | 1811132 A1 | 7/2007 |
| JP | S59129553 A | 7/1984 |
| JP | 2010213412 A * | 9/2010 |
| JP | 1981074057 A | 2/2015 |
| WO | WO-2007032736 A1 | 3/2007 |
| WO | WO-2016072095 A1 * | 5/2016 ............... F03D 9/18 |

OTHER PUBLICATIONS

Extended European Search Report for European Patent Application No. EP22173842.0, dated Nov. 11, 2022.

* cited by examiner

*Primary Examiner* — Naishadh N Desai

(57) ABSTRACT

The present disclosure relates to an electrical machine comprising a rotor rotatable about a rotor axis, a stator surrounding at least a portion of the rotor, a stator housing defining a compartment containing the stator and a cooling fluid, and a ceramic sleeve extending between the stator and the rotor. The cooling fluid is configured to surround and cool the stator during operation, and the ceramic sleeve seals the stator housing to contain the cooling fluid in the compartment. The present disclosure also relates to an aircraft that uses the electrical machine to selectively drive a propulsion system thereof.

20 Claims, 2 Drawing Sheets

CERAMIC SLEEVE FOR A STATOR HOUSING OF AN ELECTRICAL MACHINE

CROSS-REFERENCE TO RELATED APPLICATIONS

This application claims priority to and the benefit of European Patent Application No. 22173842.0, filed May 17, 2023, the entire content of which is incorporated herein by reference.

TECHNICAL FIELD

The present disclose relates to an electrical machine having, inter alia, a stator housing sealed with a ceramic sleeve. The present disclosure also relates to an aircraft including the electrical machine.

BACKGROUND

An electrical machine utilises electromagnetic forces to convert electrical energy to mechanical energy (referred to as an electric motor) or to convert mechanical energy to electrical energy (referred to as an electric generator). Electrical machines typically comprise a stator, a rotor configured to rotate relative to the stator, and one or more windings formed by a coil of conductive material, for example copper, wrapped around portions of the stator. During operation of the electrical machine as a motor, electric current is passed through the windings, which generates a magnetic field. A second magnetic field is generated by the rotor, either by permanent magnets or electromagnets/coils mounted thereon. The interaction between these two magnetic fields induces a torque on the rotor, thus causing the rotor to rotate relative to the stator. This operation may also be conducted in reverse, in that the rotor may be mechanically rotated to induce an electrical current in the windings wrapped around portions of the stator.

One use for electrical machines is to provide some or all of the energy required for the propulsion of a vehicle, such as an aircraft. The electrical machine can accordingly be used to selectively drive a propeller or gas turbine engine using the electromagnetic force provided to the rotor in motor mode. This may improve efficiency for the aircraft, as it can reduce the amount of fuel needed to power the propeller or gas turbine engine. Electrical energy can also be recovered by operating the electrical machine in generator mode. This energy can be used to power electrical aircraft or be stored for later deployment, e.g., in a battery.

The power required to drive an electrical machine at sufficient speeds for such an application can exceed 1 MW. Such power requirements can generate excessive heat during use of the electrical machine, which if left unmitigated can damage the electrical machine. The electrical machine can accordingly include a cooling fluid therein, which is pumped around the stator windings during operation to keep them cool. A sleeve has been added to the stator housing in order to contain the cooling fluid therein around the stator windings. Previously, such a sleeve has been made out of a metal or carbon fibre, as high strength properties are needed to contain the cooling fluid as it is pumped around the stator under high pressure.

Although such sleeves may be adequate to retain the cooling fluid and allow operation of the electrical machine, these materials have a degree of conductivity that can cause electromagnetic loses between the stator and rotor. Such losses can reduce the efficiency of the electrical motor or generator and cause undesirable heating of the sleeve. The embodiments of the present disclosure aim to address these issues.

SUMMARY

From one aspect, the present disclosure provides an electrical machine comprising a rotor rotatable about a rotor axis, a stator surrounding at least a portion of the rotor, a stator housing defining a compartment containing the stator and a cooling fluid, and a ceramic sleeve extending between the stator and the rotor. The cooling fluid is configured to surround and cool the stator during operation, and the ceramic sleeve seals the stator housing to contain the cooling fluid in the compartment.

In an embodiment of the above, the stator housing comprises opposing, first and second end walls joined by a base plate defining the compartment. The ceramic sleeve is secured to the first and second end walls to seal the compartment.

In a further embodiment of either of the above, the first and second end walls include respective first and second grooves defined therein and the ceramic sleeve is secured in the first and second grooves.

In a further embodiment of any of the above, a first O-ring seal is seated in the first groove and a second O-ring seal is seated in the second groove to provide sealing with the ceramic sleeve.

In yet a further embodiment, the first and second O-ring seals are elastomeric.

In a further embodiment of any of the above, the ceramic sleeve is made of zirconia.

In a further embodiment of any of the above, the ceramic sleeve has a radial cross-sectional thickness of between 1.0 to 2.0 mm. In one embodiment, the radial cross-sectional thickness is about 1.5 mm.

In a further embodiment of any of the above, an air gap is defined radially between the ceramic sleeve and the rotor. In one embodiment, the air gap is 0.3-0.7 mm. In another embodiment, the air gap is about 0.5 mm.

In a further embodiment of any of the above, the ceramic sleeve is a tubular element surrounding the circumference of the rotor.

In a further embodiment of any of the above, the stator includes a core structure and coils of wire that are operable to generate an electromagnetic force for rotating the rotor. In yet a further embodiment, the core structure is a laminated structure. In one such embodiment, the laminated structure comprises laminations of ferrous material. Such ferrous materials can include, for example, a silicon-iron alloy, cobalt-iron alloy or iron alloy.

In a further embodiment of any of the above, the cooling fluid is oil.

From another aspect, the present disclosure provides an aircraft comprising the electrical machine of the above aspect or any of the embodiments thereof. The electrical machine is configured to selectively drive a propulsion system of the aircraft. For example, in one embodiment, the aircraft comprises a propeller or turboprop engine, and the electrical machine is configured to selectively drive the propeller or turboprop engine. In another embodiment, the aircraft comprises a gas turbine engine, and the electrical machine is configured to selectively drive the gas turbine engine.

BRIEF DESCRIPTION OF DRAWINGS

Various embodiments of this disclosure will now be described by way of example only, with reference to the accompanying drawings in which.

DETAILED DESCRIPTION OF DRAWINGS

Figure 1:
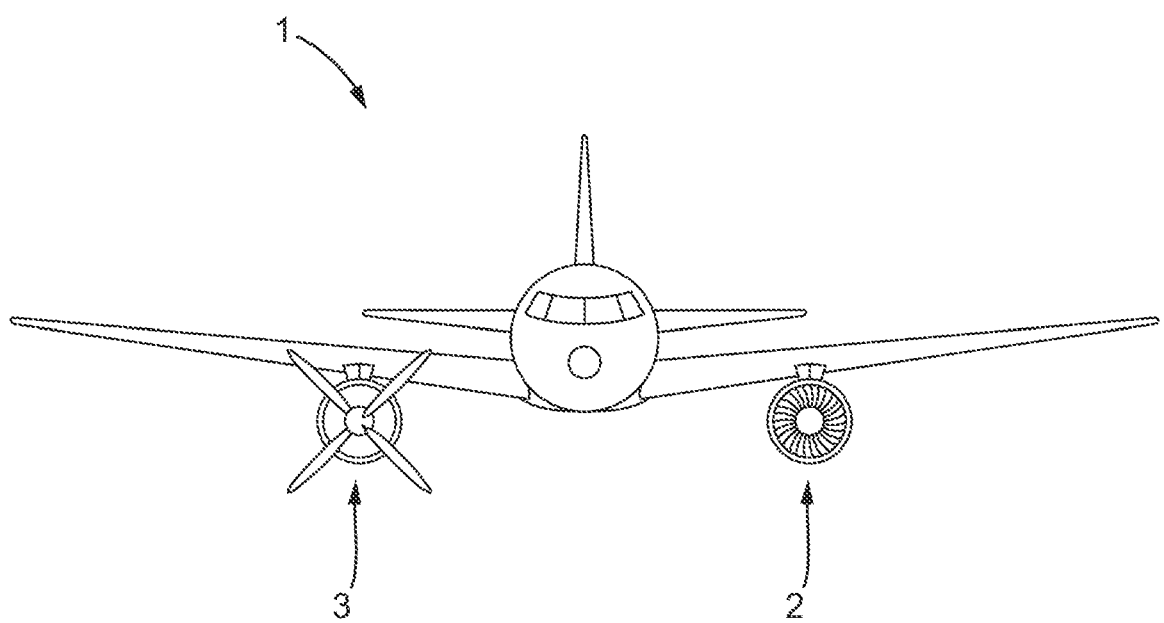
FIG. 1 shows an aircraft illustrating two alternative arrangements in which the electrical machine of the present disclosure may be used.

With reference to FIG. 1 there is illustrated an aircraft 1. The aircraft illustrated includes a gas turbine engine 2 on one wing and a propeller 3 (or turboprop) on an opposing wing. The gas turbine engine 2 and propeller 3 may be referred to as propulsion systems and as discussed below, may be selectively driven by an electrical machine 10 according to the present disclosure. The gas turbine engine 2 and propeller 3 are shown on the same aircraft 1 for illustration purposes. Aircrafts used in accordance with the disclosure will generally either have one or more gas turbine engines 2 on both wings or one or more propellers 3 on both wings, but not both in the way shown in FIG. 1. Alternatively, other propulsion systems capable of being driven by electrical machine 10 (described below) may be used on an aircraft. Similarly, more than two propulsion systems may be used, for example, an aircraft may include four or more propulsion systems. These propulsion systems operate at high power (e.g., in excess of 1 MW), and at high operating temperatures.

The electrical machine 10 (or motor) can be used to selectively drive or provide additional driving force to the propulsion systems 2, 3 at certain flight conditions, typically those that require higher power output. For example, the electrical machine 10 may be used during take-off of the aircraft 1. In this way the electrical machine 10 can supplement the traditional fuel driven operation of the propulsion systems 2, 3 to thereby reduce fuel consumption at the most power intensive operation of the aircraft 1. Alternatively, when the electrical machine 10 is a generator, the electrical machine 10 can be driven by excess power derived from the propulsion systems 2, 3 to generate electrical energy that can be stored (e.g., by charging a battery), ready for later deployment by the electrical machine 10 or for use elsewhere in other systems (e.g., to supplement power provided to the various electrical systems of the aircraft).

Figure 2:
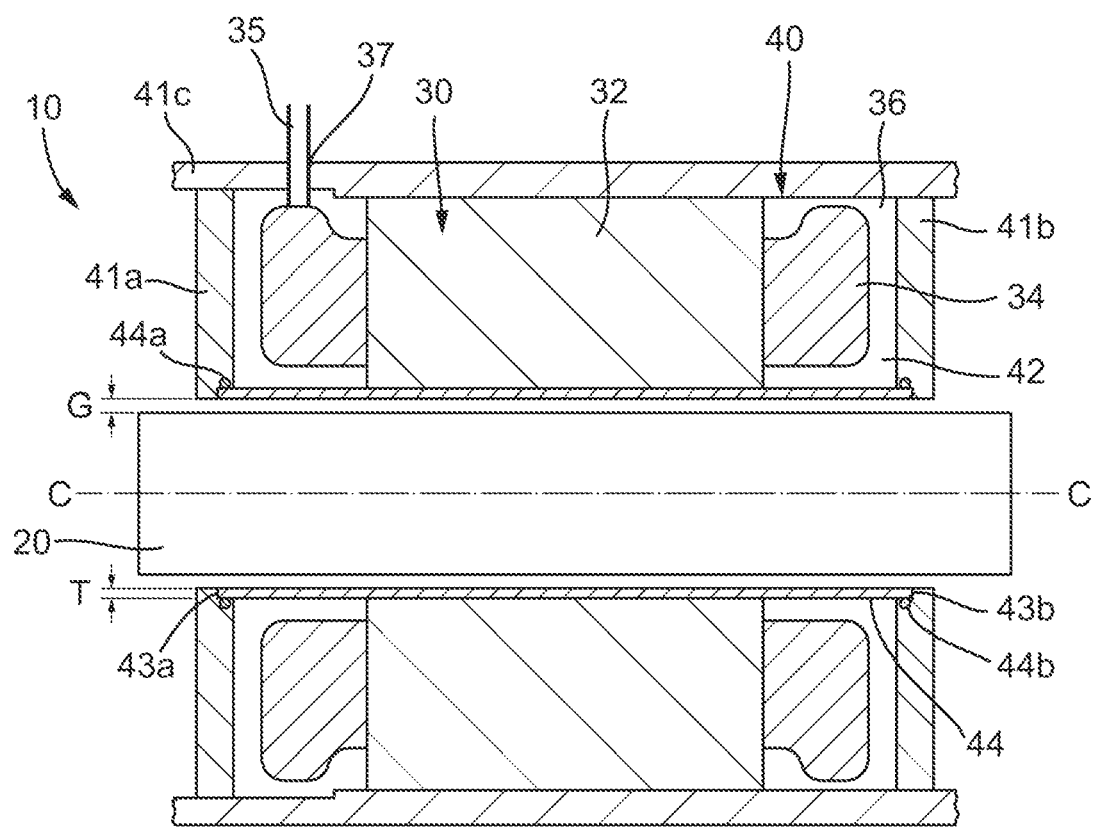
FIG. 2 shows a schematic cross-sectional view of an exemplary electrical machine according to an embodiment of the present disclosure.

With reference to FIG. 2, there is provided an electrical machine 10 in accordance with an embodiment of the present disclosure. The electrical machine 10 includes a rotor 20 that rotates about a rotor axis C. In the depicted embodiment, the rotor axis C is a central axis of the electrical machine 10. The rotor 20 may be a shaft, for example of the gas turbine engine 2, propeller 3, or other propulsion system, or may be a part attached to a shaft of the gas turbine engine 2, propeller 3, or other propulsion system. The rotor 20, or at least part of the rotor 20 is magnetic (or ferromagnetic), or can include electromagnets (e.g., coil windings) thereon.

The electrical machine 10 includes a stator 30 that surrounds at least a portion of the rotor 20. In the depicted embodiment, the stator 30 surrounds a circumference of the rotor 20, and the stator 30 is concentrically arranged with respect to the rotor 20.

The illustrated stator 30 includes a core structure 32 and coils of wire 34. Together, the core structure 32 and coils of wire 34 are operable to generate an electromagnetic force for rotating the rotor 20, or vice versa, in that rotation of the rotor 20 can generate an electromagnetic force for inducing current in the coils of wire 34. Depending on the arrangement of the stator 30 and rotor 20, the electrical current either provided to or by the coils of wire 34 may be alternating current (AC) or direct current (DC). The core structure 32 may be a laminated structure, and may comprise laminations of ferrous material, for example, a silicon-iron alloy, cobalt-iron alloy, or iron alloy. The coils of wire 34 can be coated in a protective coating such as a resin or enamel coating, to seal them and protect them from e.g., corrosion.

The stator 30 is housed within a stator housing 40 that defines a compartment 42. The compartment 42 is annular in the illustrated electrical machine 10 and surrounds the circumference of the rotor 20. The stator 30 is located within the compartment 42. Cooling fluid 36, such as oil, is also housed within the compartment 42 in such a way as to surround and cool the stator 30 during operation. The cooling fluid 36 may be pumped around the stator 30 and may thereby (or otherwise) be periodically refreshed. For example, the cooling fluid 36 could be pumped to a heat exchanger (not shown) elsewhere in a system to be cooled and then reused as cooling fluid 36. The coating on the coils of wire 34 discussed above can help isolate the coils of wire 34 from the cooling fluid 36. In this manner, the cooling fluid 36 can be prevented from shorting the coils of wire 34 during operation or corroding them.

The stator housing 40 includes a first end wall 41a and a second end wall 41b. The second end wall 41b opposes the first end wall 41a and is spaced therefrom along the rotor axis C. The stator 30 is located between the first end wall 41a and the second end wall 41b. Each of the first and second end walls 41a, 41b are disc-shaped and have a hole at their centre. They extend annularly about the rotor axis C and surround the circumference of the rotor 20. There is a gap between the radially inner edges of each of the first end wall 41a and second end wall 41b and the radially outer surface of the rotor 20. This gap may be substantially constant around a circumference defined by each of the radially inner edges of the end walls 41a, 41b, due to the rotor 20 and the end walls 41a, 41b being centred about the rotor axis C.

The stator housing 40 also includes a base plate 41c, which may be a cylindrical or tubular element, located radially outwards of each of the stator 30 and the first and second end walls 41a, 41b.

The first and second end walls 41a, 41b may be joined to the tubular base plate 41c such that the cooling fluid 36 cannot pass there between. For example, they may be welded or brazed together or joined in another method that results in a fluid tight seal. Alternatively, the first and second end walls 41a, 41b may be integrally formed with the tubular base plate 41c.

The base plate 41c includes an opening 37 for connecting wires 35 from the stator 30 to pass through. As will be appreciated by the skilled person, the connecting wires 35 can be used to connection the coils of wires 34 to a control system (not shown) to provide electrical energy to the coils of wires 34 as needed to enable operation of the electrical machine 10. The opening 37 may be sealed so as to prevent cooling fluid 36 from exiting the compartment 42 at the opening 37. For example, it may include an elastomeric seal therein that provides a fluid tight seal between the opening 37 and the connecting wires 35.

The electrical machine 10 also includes a ceramic sleeve 44 which, together with the stator housing 40 (i.e., formed by end walls 41a, 41b and base plate 41c) defines the compartment 42. The ceramic stator sleeve 44 is impermeable to the cooling fluid 36 and is secured to the stator housing 40 to seal the compartment 42. That is, cooling fluid 36 cannot pass between the ceramic sleeve 44 and the stator housing 40 and out of the compartment 42. Similarly, air, or other fluids, cannot pass from outside the compartment 42 into the compartment 42 between the ceramic sleeve 44 and the stator housing 40.

Seals are provided between the ceramic sleeve 44 and the stator housing 40. In particular, in the depicted embodiment, the electrical machine 10 includes a first O-ring seal 44a and a second O-ring seal 44b. Although one particular construction is depicted and discussed below, it should be understood that any other construction and method of securing the ceramic sleeve 44 to the stator housing 40 in a fluid tight manner known to the skilled person may be used within the scope of the present disclosure.

The first O-ring seal 44a is seated in a first groove 43a. The first groove 43a, as illustrated, is defined in the first end wall 41a. More particularly, the first groove 43a is provided in a radially inner edge of the first end wall 41a at an inner circumference thereof. The first O-ring seal 44a has a thickness greater than the depth of the first groove 43a such that the first O-ring seal 44a is proud of the radially inner edge of the first end wall 41a. The first O-ring seal 44a may accordingly be sealingly in contact with a radially outer surface of the ceramic sleeve 44. The first O-ring seal 44a may be formed from elastomeric material. As such, the first O-ring seal 44a can maintain a sealing relationship between the first end wall 41a and the ceramic sleeve 44 even at high temperatures, because the first O-ring seal 44a is able to accommodate different thermal expansion of the ceramic sleeve 44 and the stator housing 40, which includes the first end wall 41a.

The first groove 43a also provides a seat in which the ceramic sleeve 44 may be secured to the first end wall 41a.

The second O-ring seal 44b is seated in a second groove 43b. The second groove 43b, as illustrated, is defined in the second end wall 41b. More particularly, the second groove 43b is provided in a radially inner edge of the second end wall 41b at an inner circumference thereof. The second O-ring seal 44b has a thickness greater than the depth of the second groove 43b such that the second O-ring seal 44b is proud of the radially inner edge of the second end wall 41b. The second O-ring seal 44b may accordingly be sealingly in contact with a radially outer surface of the ceramic sleeve 44. The second O-ring seal 44b may be formed from elastomeric material. As such, the second O-ring seal 44b can maintain a sealing relationship between the second end wall 41b and the ceramic sleeve 44 even at high temperatures, because the second O-ring seal 44b is able to accommodate different thermal expansion of the ceramic sleeve 44 and the stator housing 40, which includes the second end wall 41b.

The second groove 43b also provides a seat in which the ceramic sleeve 44 may be secured to the second end wall 41b.

The sealing provided by the O-ring seals 44a, 44b, and also optionally around the opening 37 contains the cooling fluid 36 in the compartment 42, which is important in the high temperature and high power operations of the electrical machine 10, particularly when used in an aircraft 1 as described above. The cooling fluid 36 may be under significantly higher pressure than the environment outside the compartment 42.

In the depicted embodiment, and as discussed above, the ceramic sleeve 44 is tubular in shape, and more particularly cylindrical. The ceramic sleeve 44 is arranged concentrically between the rotor 20 and the stator 30, and extends beyond the axial ends of the stator 30 to engage sealingly with the first and second end walls 41a, 41b as described above. The ceramic sleeve 44 surrounds the circumference of the rotor 20. The ceramic sleeve 44 can be secured into the first and second grooves 43a, 43b using a push fit or other suitable type of fit.

The ceramic sleeve 44 has a relatively small radial cross-sectional thickness T. For example, the radial cross-sectional thickness T may be between 0.5 to 10.0 mm. More specifically, the radial cross-sectional thickness T may be 1.0 to 2.0 mm, for example 1.5 mm. Minimising the thickness T of the ceramic sleeve 44 in this way can minimise the weight of the electrical machine 10 and also the gap between the stator 32 and the rotor 20, without compromising the strength of the sleeve 44 to contain the high pressure cooling fluid 36 therein.

An air gap G is provided radially between the ceramic sleeve 44 and the rotor 20, that is to say, between the radially outer surface of the rotor 20 and the radially inner surface of the ceramic sleeve 44. The air gap G may be between 0.1 and 10 mm. More specifically, the air gap G may be between 0.2 and 2 mm, or between 0.3 and 0.7 mm, for example 0.5 mm.

This air gap G may be equal to the gap between the radially inner edges of each of the first end wall 41a and second end wall 41b and the radially outer surface of the rotor 20, when the grooves 43a, 43b are radially set within each of the first end wall 41a and second end wall 41b. That is, the inner radius of the first and second end walls 41a, 41b is equal to the inner radius of the ceramic sleeve 44. In this way the first end wall 41a and second end wall 41b may prevent axial movement of the ceramic sleeve 44.

The sum of the cross-sectional radial thickness T of the ceramic sleeve 44 and the air gap G defines the overall spacing between the stator 30 and the rotor 20. Efficiency improvements can be made by making the overall spacing as small as possible; however, a large enough air gap G is required to mitigate the risk of contact between the rotor 20 and the ceramic sleeve 44 during operation due to the high temperatures and speeds involved and the manufacturing tolerances of the parts.

The ceramic sleeve 44 is formed of a ceramic material. The ceramic material may be selected from a list including alumina, aluminium nitride, zirconia, silicon carbide, silicon nitride, titania, titanium carbide, titanium nitride. Particular example materials include zirconia and aluminium nitride.

The selection of such ceramic materials provides high strength and high stiffness for retaining the cooling fluid 36 effectively, whilst not providing a conductive material that could act to provide electromagnetic losses between the stator 30 and the rotor 20, for example resulting from induced eddy currents therein. This can also prevent undesirable heating occurring in the sleeve 44 during operation of the electrical machine 10.

The stator housing 40 can still be formed of appropriate metal or metallic alloys, because it is not located in such critical locations for the inducement of electromagnetic losses between the stator 30 and the rotor 20. The stator housing 20 can accordingly be made of any suitable metallic material, such as an aluminium or stainless steel alloy.

The invention claimed is:
1. An electrical machine comprising:
a rotor rotatable about a rotor axis;
a stator surrounding at least a portion of the rotor;
a stator housing defining a compartment containing the stator and a cooling fluid, wherein the cooling fluid is configured to surround and cool the stator during operation; and a ceramic sleeve extending between the stator and the rotor and sealing the stator housing to contain the cooling fluid in the compartment, wherein the ceramic sleeve is seated in grooves formed into each of first and second end walls and adjacent to gaps between radially inner edges of the first and second end walls and a radially outer surface of the rotor.

2. The electrical machine of claim 1, wherein the first and second end walls are joined by a base plate defining the compartment, and the ceramic sleeve is secured to the first and second end walls to seal the compartment.

3. The electrical machine of claim 2, wherein the first and second end walls include respective first and second grooves defined therein, and the ceramic sleeve is secured in the first and second grooves.

4. The electrical machine of claim 3, further comprising a first O-ring seal seated in the first groove and a second O-ring seal seated in the second groove to provide sealing with the ceramic sleeve.

5. The electrical machine of claim 4, wherein the first and second O-ring seals are elastomeric.

6. The electrical machine of claim 1, wherein the ceramic sleeve is made of zirconia.

7. The electrical machine of claim 1, wherein the ceramic sleeve has a radial cross-sectional thickness of between 1.0 mm and 2.0 mm.

8. The electrical machine of claim 7, wherein the ceramic sleeve has a radial cross-sectional thickness of 1.5 mm.

9. The electrical machine of claim 1, wherein an air gap is defined radially between the ceramic sleeve and the rotor.

10. The electrical machine of claim 9, wherein the air gap is 0.3-0.7 mm.

11. The electrical machine of claim 10, wherein the air gap is 0.5 mm.

12. The electrical machine of claim 1, wherein the ceramic sleeve is a tubular element surrounding a circumference of the rotor.

13. The electrical machine of claim 1, wherein the stator includes a core structure and coils of wire that are operable to generate an electromagnetic force for rotating the rotor.

14. The electrical machine of claim 13, wherein the core structure is a laminated structure.

15. The electrical machine of claim 14, wherein the laminated structure comprises laminations of a ferrous material.

16. The electrical machine of claim 15, wherein the ferrous material includes one of: silicon-iron alloy, cobalt-iron alloy, or iron alloy.

17. The electrical machine of claim 1, wherein the cooling fluid is oil.

18. An aircraft comprising the electrical machine of claim 1, wherein the aircraft comprises one of:
a propeller, wherein the electrical machine is configured to selectively drive the propeller; or
a gas turbine engine, wherein the electrical machine is configured to selectively drive the gas turbine engine.

19. An electrical machine comprising:
a rotor rotatable about a rotor axis;
a stator surrounding at least a portion of the rotor;
a stator housing defining a compartment containing the stator and a cooling fluid, the stator housing comprising:
a first end wall having a first groove defined in a radially inner edge of the first end wall;
a second end wall having a second groove defined in a radially inner edge of the second end wall; and
a base plate joining the first and second end walls; and
a ceramic sleeve seated in the first and second grooves of the first and second end walls and adjacent to gaps between the radially inner edges of the first and second end walls and a radially outer surface of the rotor.

20. The electrical machine of claim 19, further comprising:
a first O-ring in the first groove and in contact with the ceramic sleeve; and
a second O-ring in the second groove and in contact with the ceramic sleeve.

* * * * *